June 17, 1947.  H. C. JENKS  2,422,551

REGULATING SYSTEM

Filed Sept. 20, 1944

WITNESSES:
Edward Michaels
Leon J. Vaja

INVENTOR
Harold C. Jenks.
BY
James N. Ely
ATTORNEY

Patented June 17, 1947

2,422,551

UNITED STATES PATENT OFFICE 2,422,551

REGULATING SYSTEM

Harold C. Jenks, Cincinnati, Ohio, assignor to Westinghouse Electric Corporation, East Pittsburgh, Pa., a corporation of Pennsylvania Application September 20, 1944, Serial No. 554,909

5 Claims. (Cl. 172—246)

This invention relates to electrical systems and, in particular, to power factor regulating systems.

An object of this invention is to provide a regulating system responsive to fluctuations in power factor to maintain the power factor of a load system at substantially a predetermined value under no load and load conditions.

Another object of this invention is to regulate the power factor of a synchronous motor by utilizing a dynamo-electric machine for controlling the excitation thereof, the machine being energized in response to the power factor drawn by the synchronous motor.

Figure 1:
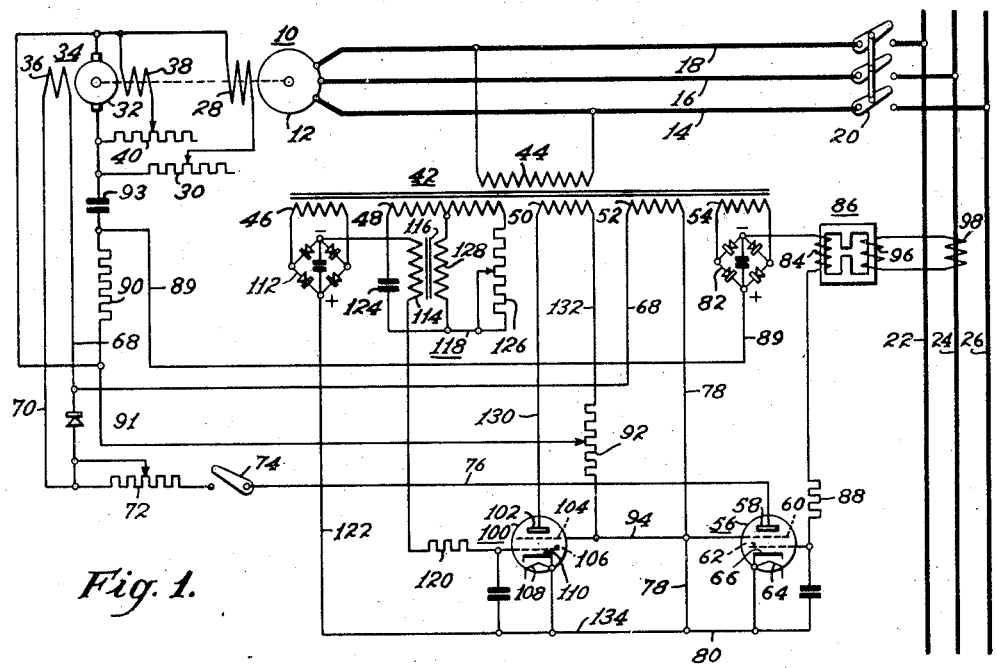
Figure 2:
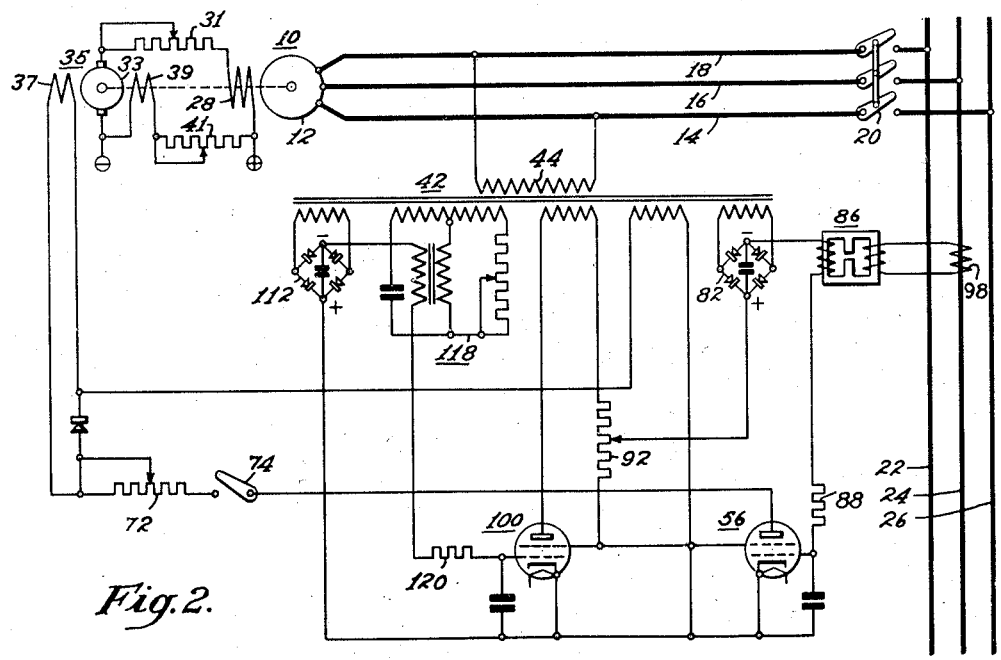

Other objects of this invention will become apparent from the following description when taken in conjunction with the accompanying drawing, in which:

Figure 1 is a diagrammatic view of apparatus and circuits embodying the teachings of this invention; and Fig. 2 is a diagrammatic view of apparatus and circuits utilized in another embodiment of the teachings of this invention.

Referring to the drawing, a synchronous motor 10 is illustrated as having its armature windings 12 connected by conductors 14, 16 and 18 through a three pole switch 20 to load conductors 22, 24 and 26. The synchronous motor 10 is provided with field windings 28 which are connected through an adjustable rheostat 30 to the armature windings 32 of an exciter 34 whereby the excitation of the motor 10 is determined by the output of the exciter. The exciter 34 may be driven by any suitable prime mover (not shown).

In this instance the exciter 34 is provided with opposed field windings 36 and 38, the windings 38 being self-energized and being connected through an adjustable resistor 40 across the armature windings 32. By adjusting the resistors 30 and 40 the degree of excitation of the synchronous motor 10 is determined whereby the maximum permitted leading power factor drawn by the synchronous motor 10 is determined.

The field windings 36 are disposed to be separately excited in response to the power factor drawn by the synchronous motor and consequently in response to the power factor of the load system. As a source of power for the windings 36, a potential transformer 42 having its primary winding 44 connected across conductors 14 and 18 is utilized. The transformer 42 is provided with a plurality of secondary windings 46, 48, 50, 52 and 54, the purpose of which will be explained more fully hereinafter.

In order to control the energization of the field windings 36, the windings 36 are disposed to be connected through an electric valve discharge device 56 to the secondary winding 52 of the transformer 42. The electric valve 56, comprises an anode 58, a screen grid 60, a biasing grid 62, a heater 64 and a cathode 66. The electric valve 56 has the characteristics that when used on alternating current voltage, if rendered conducting by a grid impulse, it will conduct current for the remaining portion of the positive half cycle of the voltage wave but will be rendered non-conducting when the voltage decreases to the arc drop value of the valve and will not be reestablished during the negative half cycle of that voltage wave.

As illustrated, the secondary winding 52 of the transformer 42 for supplying current to the field winding 36 has one of its terminals connected by conductor 68 to a terminal of the field windings 36, the other terminal of which is connected by conductor 70 through an adjustable resistor 72, a switch 74 and conductor 76 to the anode 58 of the valve 56. The other terminal of the secondary winding 52 is connected by conductors 78 and 80 to the cathode 66 of electric valve 56. The resistor 72 is included in the field circuit just described in order to provide an adjustment for determining or limiting the maximum current flow in the field windings 36 to determine the maximum energization of the field windings 36 in opposition to that of the opposed field windings 38.

In order to provide a negative bias on the grid 62 of electric valve 56, the secondary winding 54 of the transformer 42 is connected across the input terminals of a rectifying bridge circuit 82, one of the output terminals of which is connected through the secondary winding 84 of an impulse transformer 86 and a resistor 88 to the grid 62, the other output terminal of the bridge circuit being connected by conductor 89 through resistor 90, conductor 91, a part of a resistor 92 and conductors 94, 78 and 80 to the cathode 66. As illustrated, the resistor 90 is connected in series circuit with a capacitor 93, the resistor-capacitor combination being connected across the armature windings 32 of the exciter 34 and the resistor 90 connected in the grid circuit of valve 56 to provide anti-hunt characteristics in the operation of the regulating system.

The impulse transformer 86 is provided for controlling the firing of the valve 56 in response to the phase angle of the load system. As illustrated, the primary winding 96 of the transformer 86 is connected to a current transformer 98 which is disposed in inductive relation with the load conductor 24. The impulse transformer 86 is of a type well known to industry, the leg of the magnetic core upon which the secondary winding 84 is wound being so designed that it will saturate very early in the current cycle and as a result of the rapid saturation will provide a peaked impulse of considerable magnitude. Thus, although the valve 56 is normally maintained non-conducting by the negative bias applied thereto, when the impulse transformer 86 impresses its peaked voltage on the grid biasing circuit, the grid 62 is rendered less negative or more positive to cut the critical grid voltage of the valve 56 and render the valve conductive.

The phase position of the impulse impressed on the grid circuit by the impulse transformer 86 will be dependent upon the angle of the current being drawn by the synchronous motor. Thus at unity power factor the impulse comes at the peak of the positive half cycle of the voltage wave whereas for a leading power factor the impulse comes at an earlier time in the positive half cycle of the voltage wave and for a lagging power factor the impulse comes later in the positive half cycle of the voltage wave. Thus with the field windings 36 connected across the anode 58 and the cathode 66 of electric valve 56, it is apparent that the current flow through the windings 36 is dependent upon the firing of the valve 56, the conductivity of which is controlled by the impulse transformer 86 in response to the power factor of the system.

As will be apparent if the synchronous motor 10 is pulling a leading power factor load as it would be if switch 20 were in the closed circuit position and switch 74 were in the open circuit position and resistors 30 and 40 were properly adjusted, then by closing switch 74 to connect the regulating system in circuit with the field winding 36, it will be seen that by reason of the impulse transformer 86 the valve 56 will fire early in the positive half cycle of the voltage wave to pass current through the field windings 36. By thus energizing the field windings 36 in opposition to the field windings 38, the output of the exciter 34 is so changed as to reduce the excitation of the synchronous motor 10 as to tend to force it to draw a lagging power factor.

In order to determine the power factor at which this forcing action of the field windings 36 is limited and to provide a means for establishing or selecting the power factor at which the system will regulate, another electric valve 100 is disposed to control the bias of the grid 62 of the electric valve 56. The valve 100 is similar to the valve 56 having the same characteristics and being provided with an anode 102, a screen grid 104, a biasing grid 106, a heater 108 and a cathode 110.

As illustrated, the secondary winding 46 of transformer 42 is utilized for providing a negative bias on the grid 106, the winding 46 being connected across the input terminals of a rectifying bridge circuit 112, one of the output terminals of which is connected through the secondary winding 114 of grid transformer 116 in a grid shift network system or phase shifting circuit 118 and resistor 120 to the grid 106, the other output terminal of the bridge circuit 112 being connected by conductor 122 to the cathode 110.

The grid shift network 118 is supplied by the secondary winding 48 of the transformer 42, the secondary winding 48 being connected across the series connected capacitor 124 and adjustable resistor 126, the primary winding 128 of the grid transformer 116 being connected across the midpoint terminal of the secondary winding 48 and the junction of the capacitor 124 and resistor 126. By adjusting the number of sections of the resistor 126 connected in the grid shift network system an adjustment is made in the phase angle in which the valve 100 becomes conducting. This adjustment is independent of the power factor of the load drawn by the synchronous motor 10.

The anode 102 of the valve 100 is connected by conductor 130 to a terminal of the secondary winding 50 of transformer 42, the other terminal of the secondary winding 50 being connected by conductor 132 through resistor 92 and conductors 94, 78 and 134 to the cathode 110 of valve 100. Thus the output of valve 100 impresses a voltage on the grid biasing circuit of valve 56 by reason of the interconnected resistor 92 which is additive to the normal negative bias to definitely render the bias on grid 62 negative. This output is determined by the phase angle for which the grid shift network 118 is adjusted, such phase angle being independent of the power factor of the load drawn by the synchronous motor 10 as referred to hereinbefore.

Because of the characteristics of the valves 56 and 100, if valve 56 is rendered conductive by the action of the impulse transformer 86 in response to the power factor before valve 100 is rendered conducting, the valve 56 will remain conductive for the remaining portion of the positive half cycle of the voltage wave and the firing of the valve 100 will have no effect on the valve 56. However, if by reason of the phase angle adjustment of the network 118 or by reason of a change in the power factor of the load system tending toward a lagging power factor, the impulse from the impulse transformer 86 should come later in the voltage wave than the phase angle controlling the firing of valve 100, then the negative bias impressed on the grid circuit of valve 56 by reason of the valve 100 being rendered conductive is sufficient to maintain the valve 56 non-conducting whereby the field windings 36 are maintained de-energized. Thus only the field windings 38 are active in so controlling the excitation of the synchronous motor 10 as to cause it to draw a more leading power factor.

In operation, assuming that the resistors 30 and 40 have been adjusted to determine the excitation of the synchronous motor for the maximum leading power factor which is to be permitted and that the resistor 72 is adjusted to determine the maximum energization of the field windings 36 for determining the lagging power factor of the synchronous motor 10, if then the switches 20 and 74 are actuated to a circuit closing position and the valves 56 and 100 are heated for operation, the synchronous motor 10 will draw a leading power factor.

Since the synchronous motor draws a leading power factor the impulse transformer 86 functions to impress a peaked voltage on the grid biasing circuit of valve 56 early in the positive half cycle of the voltage wave to render the grid 62 less negative or more positive. When the grid is biased in this manner the valve 56 will conduct current through a circuit which may be traced from the anode 58, through conductor 76, switch 74, resistor 72, conductor 70, field windings 36, conductor 68, secondary winding 52 of the transformer 42, conductor 78 and conductor 80 to the cathode 66 of the valve 56. The current thus flowing through the field windings 36 so energizes the field windings 36 in opposition to the energization of the field windings 38 as to decrease the output of the exciter 34 and consequently reduce the excitation of the synchronous motor 10 whereby the synchronous motor 10 tends to draw a more lagging power factor. The change in the voltage of the exciter 34 affects a change in the potential across resistor 90 which changes the negative bias on the grid 62 to retard the firing of the valve 56 thereby providing anti-hunt characteristics.

If the phase shift circuit 118 is adjusted to determine the phase angle at which it is desired to limit the power factor of the synchronous motor 10 then as the field windings 36 force the synchronous motor 10 toward a lagging power factor, as soon as the phase angle is reached as established by the phase shift circuit 118, it is found that the valve 100 becomes conducting ahead of the valve 56 and that the voltage impressed on the grid circuit of the valve 56 by reason of the output of the valve 100 and the interconnecting resistor 92 is sufficient to so bias the grid 62 of the valve 56 as to maintain the grid 62 negative regardless of the functioning of the impulse transformer 86.

Thus the field forcing action of the field windings 36 is removed and the field windings 38 function to so change the output of the exciter 34 as to again increase the excitation of the synchronous motor 10 so that the motor 10 tends to draw a more leading power factor.

As soon as the power factor of the load system increases above the phase angle established by the grid shift circuit 118, the peaked impulse of the impulse transformer 86 is impressed upon the grid biasing circuit of the valve 56 ahead of the negative bias impressed thereon by the valve 100 and the valve 56 thereby becomes conducting to again energize or effect a field forcing operation of the field windings 36 to again tend to so excite the synchronous motor 10 that it tends to draw a more lagging power factor. It is thus seen that by adjusting the resistor 126 of the phase shift circuit 118 that it is possible to select any predetermined power factor at which it is desired to have the synchronous motor 10 operate.

The regulating system of this invention is not to be limited by the use of an exciter 34 as described hereinbefore for it is found that any suitable dynamo-electric machine having opposed field windings can be so controlled as to regulate the power factor of the synchronous machine 10. For example, reference may be had to the embodiment of this invention illustrated in Fig. 2 of the drawing in which like numerals identify like parts of Figs. 1 and 2.

In the embodiment illustrated in Fig. 2 all components of the system are identical to those of Fig. 1 with the exception of the dynamo-electric machine utilized for controlling the excitation of the synchronous motor 10. For simplicity of the drawing the anti-hunt circuit is not illustrated, it being understood that the anti-hunt circuit of Fig. 1 or other suitable anti-hunt circuits can be employed. In this embodiment instead of the exciter 34 a booster 35 is utilized, the booster having armature windings 33 and opposed field windings 37 and 39. In this instance the field windings 28 of the synchronous motor 10 are disposed to have their primary source of excitation supplied from a separate source as represented by the positive and negative symbols. The armature windings 33 of the booster 35 are connected in series with the field windings 28 whereby the output of the booster 35 is impressed upon the constant source of supply for the field windings 28. As illustrated, the armature windings 33 of the booster 35 have one terminal connected to the negative source of supply, the other terminal being connected through an adjustable resistor 31 to one terminal of the field windings 28 of the synchronous motor 10, the other terminal of which is connected to the positive terminal of the constant source of supply. The field windings 39 for the booster 35 are connected across the constant source of supply through an adjustable resistor 41, the field windings 39 functioning to so control the output of the booster 35 that such output is additive to the constant source of supply for increasing the excitation of the motor 10 whereby the synchronous motor 10 tends to draw a leading power factor. By adjusting the resistors 31 and 41, the maximum leading power factor which the synchronous motor 10 may draw can be determined.

As in the case of the exciter, the other field windings 37 of the booster 35 opposes the field windings 39 so that when current is passed therethrough, the field windings 37 function to decrease the output of the booster 35 and so change the excitation of the synchronous motor 10 that the synchronous motor tends to draw a more lagging power factor.

The remaining part of the system illustrated in Fig. 2 is identical to that illustrated and described with reference to Fig. 1, the function and operation of the component elements thereof being as described hereinbefore for controlling the field forcing the dynamo-electric machine to thereby regulate the power factor of the synchronous motor.

The system described as embodying the teachings of this invention is composed of standard components such as require very little care and attention. Once the phase angle is determined at which it is desired to regulate and the phase shift circuit 118 is adjusted for such phase angle the system requires no further maintenance. It will, of course, be understood that where it is desired to regulate for a different power factor that such regulation can readily be obtained by adjusting the phase shift circuit to limit the operation of the field forcing for maintaining the different power factor.

Although this invention has been described with reference to a particular embodiment thereof, it is, of course, not to be limited thereto except insofar as is necessitated by the scope of the appended claims.

I claim as my invention:

1. In a system for regulating the power factor of a synchronous motor connected to a load system, in combination, a dynamo-electric machine connected to control the excitation of the synchronous motor, the dynamo-electric machine having opposed field windings, one of the field windings being disposed to be energized to control operation of the dynamo-electric machine to increase the excitation of the motor, the other of the field windings functioning when energized to effect a decrease in the excitation of the motor, means including an electric valve disposed to connect the other field winding to a source of power, the electric valve having a grid to be utilized for controlling the conductivity thereof, means for applying a negative bias to the grid, means for rendering the grid positive in response to the phase angle of the system to control the energization of the other field winding, the positive biasing means including an impulse transformer connected to be responsive to the flow of current in the load system, and means responsive to a predetermined phase angle disposed to cooperate in the grid circuit of the electric valve to maintain the valve non-conducting under predetermined power factor conditions.

2. In a system for regulating the power factor of a synchronous motor connected to a load system, in combination, a dynamo-electric machine connected to control the excitation of the synchronous motor, the dynamo-electric machine having opposed field windings, one of the field windings being disposed to be energized to control operation of the dynamo-electric machine to increase the excitation of the motor, the other of the field windings functioning when energized to effect a decrease in the excitation of the motor, a plurality of electric valves having grids for controlling the energization of the other field winding, one of the valves being disposed to connect the other field winding to a source of power, a grid circuit including an impulse transformer responsive to the power factor of the load system for controlling the bias of the grid of the one valve to render the one valve conducting, the other valve being connected to impress a negative bias on the grid of the one valve to render it non-conducting when the other valve is rendered conducting ahead of the one valve, the other valve having a grid biasing circuit responsive to a predetermined phase angle whereby the other valve cooperates with the grid biasing circuit of the one valve to maintain the one valve non-conducting under predetermined power factor conditions of the load system.

3. In a system for regulating the power factor of a synchronous motor connected to a load system, in combination, a dynamo-electric machine connected to control the excitation of the synchronous motor, the dynamo-electric machine having opposed field windings, one of the field windings being disposed to be energized to control operation of the dynamo-electric machine to increase the excitation of the motor, the other of the field windings functioning when energized to effect a decrease in the excitation of the motor, a plurality of electric valves having grids for controlling the energization of the other field winding, one of the valves being disposed to connect the other field winding to a source of power, a grid circuit including an impulse transformer responsive to the power factor of the load system for controlling the bias of the grid of the one valve to render the one valve conducting, the other valve having a grid biasing circuit responsive to a predetermined phase angle to render the other valve conducting, and means interconnecting the output of the other valve with the grid biasing circuit of the one valve whereby the other valve impresses a negative bias on the grid of the one valve to render it nonconducting when the other valve is rendered conducting ahead of the one valve.

4. In a system for regulating the power factor of a synchronous motor connected to a load system, in combination, a dynamo-electric machine connected to control the excitation of the synchronous motor, the dynamo-electric machine having opposed field windings, one of the field windings being disposed to be energized to control operation of the dynamo-electric machine to increase the excitation of the motor, the other of the field windings functioning when energized to effect a decrease in the excitation of the motor, a plurality of electric valves having grids for controlling the energization of the other field winding, one of the valves being disposed to connect the other field winding to a source of power, a grid circuit including an impulse transformer responsive to the power factor of the load system for controlling the bias of the grid of the one valve to render the one valve conducting, means for applying a negative bias on the grid of the other valve, a grid shift network system disposed to impress a positive bias on the grid of the other valve at a predetermined phase angle to render the other valve conducting, and means interconnecting the output of the other valve with the grid biasing circuit of the one valve whereby the other valve impresses a negative bias on the grid of the one valve to render it non-conducting when the other valve is rendered conducting ahead of the one valve.

5. In a system for regulating the power factor of a synchronous motor connected to a load system, in combination, a dynamo-electric machine connected to control the excitations of the synchronous motor, the dynamo-electric machine having opposed field windings, one of the field windings being disposed to be energized to control the operation of the dynamo-electric machine to increase the excitation of the motor, the other of the field windings functioning when energized to effect a decrease in the excitation of the motor, a pair of electric valves having grids for controlling the energization of the other field winding, means for applying a negative bias to the grid of one of the valves, means for rendering the grid of the one valve positive in response to the phase angle of the system to control the energization of the other field winding, the positive biasing means including an impulse transformer connected to be responsive to the flow of current in the load system, means for applying a negative bias on the grid of the other valve, a grid shift network system disposed to impress a positive bias on the grid of the other valve at a predetermined phase angle to render the other valve conducting, and a resistor interconnected in the output circuit of the other valve and the grid biasing circuit of the one valve whereby the other valve impresses a negative bias on the grid of the one valve to render it non-conducting when the other valve is rendered conducting ahead of the one valve.

HAROLD C. JENKS.

REFERENCES CITED

The following references are of record in the file of this patent:

UNITED STATES PATENTS

| Number | Name | Date |
| --- | --- | --- |
| 2,272,736 | Brown | Feb. 10, 1942 |
| 1,284,574 | Boddie | Nov. 12, 1918 |
| 2,195,119 | Moyer | Mar. 26, 1940 |
| 1,857,174 | Zucker | May 10, 1932 |